United States Patent Office 3,004,123
Patented Oct. 10, 1961

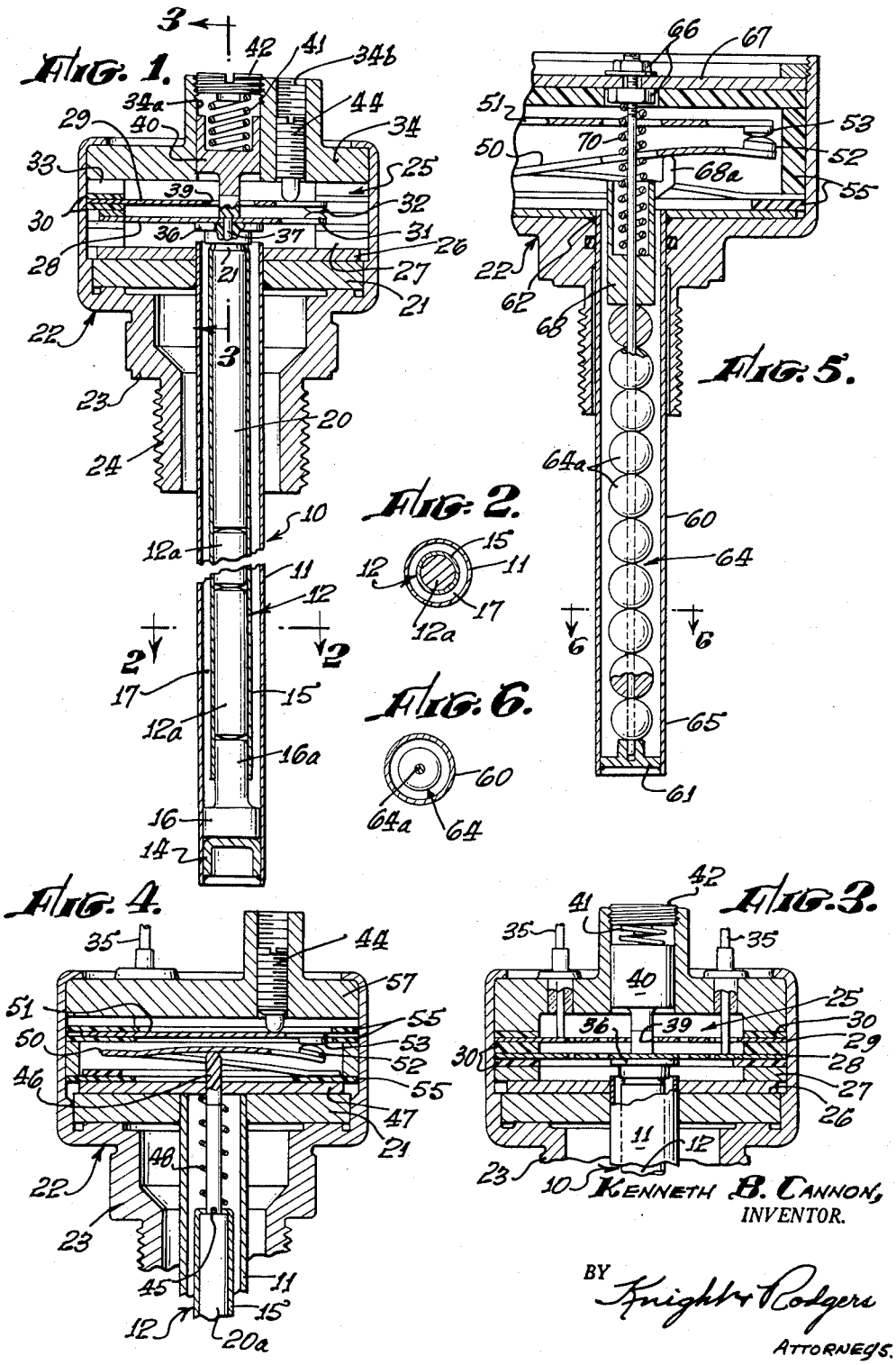

3,004,123
THERMALLY RESPONSIVE ACTUATOR
Kenneth B. Cannon, 5240 Alhambra Ave.,
Arcadia, Calif.
Filed Apr. 28, 1960, Ser. No. 25,473
7 Claims. (Cl. 200—137)

The present invention relates generally to temperature sensing or thermally responsive devices; and more especially to an actuator of that character producing mechanical movement as a result of the differential expansion or contraction of two members having different coefficients of thermal expansion. This application is a continuation-in-part of my earlier application, Serial No. 793,424, filed February 16, 1959, for "Thermal Sensing Device," now abandoned.

Actuators of this type may be used for various purposes; but frequently they are employed to open or close an electric switch and thus effect a change in an electric circuit in response to a temperature, or a change in temperature, at some point remote from the circuit. Since this is a usual and well known application of a thermally responsive actuator, I have shown and disclosed the actuator of my invention in this environment; but it will be realized that the invention is not necessarily limited thereto. For example, the actuator may be used to obtain the mechanical motion necessary to open or close a valve controlling fluid flow, or for any other purpose.

A typical and well known device of this type consists of a tube enclosing a rod, the tube and the rod constituting the two operating members of the actuator. These two operating members are connected together at or near one end in order to be fixed in their relative positions at this point. The other end of the tube is anchored to some fixed reference point in order to produce relative movement at the corresponding end of the rod; and it is this movement which is utilized to operate a switch, valve, or other device. The rod is ordinarily the member having the lower coefficient of thermal expansion; and in order to obtain the maximum differential expansion, the rod has been made of a material such as glass, ceramic, or quartz which has a very low coefficient of thermal expansion. However, actuators of this construction are not suited to many applications where they are subjected to shock or extreme vibration. Under these conditions, the non-metallic rods are broken and as a result the actuator fails to operate properly, sometimes becoming completely inoperative.

Temperature responsive devices of this character are used under very severe operating conditions in many industrial establishments, one particular and typical use being the application to a modern jet engine as used in aircraft. The present invention finds a valuable application in the afterburner of a jet engine where the temperature sensing element is subjected to severe vibration, often running into values of several thousand cycles per second, and also to severe shock loading of many times gravity. It is important that the device operate reliably under these extreme conditions and that its construction be such as to guarantee continued accurate operation over a long period of time.

In a jet engine the forces applied to the tube and rod are often sufficiently great that they become bent. In a conventional design, the rod then binds inside the tube because of the comparatively small clearance between the two members; and when the degree of bending or curvature is great enough, the rod breaks. Thus even though the rod may not break and fail completely, the operating conditions may be sufficiently severe to cause the accuracy of the device of conventional design to be impaired, the device then being of no more practical value.

A device of this character in a jet engine may be subjected to a normal ambient operating temperature in the range of 900–1000° F. This temperature may rise within a very short period of time to a value considerably above a safe temperature for the materials subjected to the temperature, in the event of any malfunctioning of the engine. It is then the duty of the actuator to energize an alarm circuit, or to cut off the fuel supply to the engine, or to accomplish some other action which will prevent an explosion or severe damage to the equipment. The danger of malfunction during the starting period is particularly great. Under these conditions, the parts of the actuator rise from a normal atmospheric temperature of say 70° F., or approximately that, to some temperature close to or within the normal operating range in the matter of a few seconds. But if malfunctioning should occur during this starting period, the actuator is called upon to respond to a short rise in temperature above the normal operating range and, to be fully effective, response must be exceedingly rapid.

Hence it is a general object of my invention to provide a thermally responsive device of the character described which can withstand successfully great vibration and shock loads and is therefore adapted to functioning under severe conditions.

It is a further object of my invention to provide a thermally responsive device of this character which continues to operate with accuracy even though the operating members are bent or curved to a substantial degree.

It is a further object of my invention to provide a thermally responsive actuator of the character described which responds very rapidly to a change in temperature.

A further object of the invention is to provide a thermally responsive actuator of improved accuracy and sensitivity at relatively high ambient temperatures, such as those encountered in jet engines and similar applications.

These objects of my invention have been achieved in a thermally responsive actuator having two operating members, one surrounding the other, with different coefficients of expansion, in which one of the two operating members is composed of a plurality of discrete elements or segments arranged in a row with successive elements in contact with each other. These elements may be spherical or elongated with at least one end convexly rounded. Restraining means maintains the segments aligned in a row and may take the form either of a tube or cage surrounding the elements or of a rod passing through them. The other or outer operating member surrounds and is spaced from the first one in order to provide an air gap between the two operating members that reduces the rate of heat transfer to the inner operating member.

The two operating members are fixed in position relative to each other at one end. A spring or similar member exerts a force against the other end of the row of elements to keep them in contact with each other but yields to thermally produced movement of the row in order to permit the mechanical motion necessary to actuate a switch or other device. The discrete elements, although maintained in a row, have the ability to move angularly relative to one another while maintaining contact with each other, thus providing a flexible operating member that is able to operate effectively and accurately even though the row is no longer a straight one.

In a preferred form of the invention, one operating member includes a compensator at one end of the row of discrete elements. The compensator makes it possible for the actuator to operate at the same temperatures whether the parts are cold or hot so that the engine operating conditions do not affect the pre-set ambient temperature at which the switch is opened.

How the above objects and advantages of my invention, as well as others not mentioned, are attained, will be better understood by reference to the following description and to the annexed drawing, in which:

FIG. 1 is a longitudinal median section of a preferred embodiment of my invention, associated with an electric switch of the normally closed variety which is operated by the actuator.

FIG. 2 is a transverse section on line 2—2 of FIG. 1.

FIG. 3 is a vertical section on line 3—3 of FIG. 1.

FIG. 4 is a fragmentary longitudinal median section through the upper end of a variational form of my invention.

FIG. 5 is a longitudinal median section through a variational embodiment of my invention.

FIG. 6 is a transverse section on line 6—6 of FIG. 5.

Referring now to FIGS. 1–3, there is illustrated a preferred form of my invention adapted to operate an electric switch. The thermally responsive actuator as a whole is indicated at 10, and comprises two coaxial operating members 11 and 12. The outer member 11 is a cylindrical metal tube closed at one end by fixed plug 14. The tube may be of any suitable metal having a sufficiently large coefficient of thermal expansion. The inner operating member 12 includes a plurality of discrete elements 12a which are made of glass, quartz or any other suitable material having an extremely low coefficient of thermal expansion. Although these discrete elements 12a may assume a variety of shapes, each individual element here is shown in the form of a short cylinder having a convex rounded surface at each end. The diameter of the elements 12a is such as to have a free sliding fit within metal tube 15 which is a restraining means to keep the elements 12a in axial alignment. Inner tube 15 is centered within the tubular operating member 11 by means of guide member 16 to space tubes 15 and 11 apart annularly as indicated at 17. Guide 16 has a base which is the full diameter of the inside of the tubular operating member 11 and has an axially extending stud 16a which has a sliding fit within tube 15, thus providing for relative movement of the end of tube 15 with respect to the centering guide 16. The lower element 12a rests against the upper end of stud 16a. Guide 16 is preferably ceramic or other low expansion material.

The upper end of tube 15 is attached to compensator 20 by crimping the end of the tube into an annular groove 21 in the rod-like compensator. Compensator 20 is a cylindrical rod having a diameter substantially equal to the inner diameter of tube 15. It extends beyond the upper ends of tubes 11 and 15 from the upper end of the row of elements 12a, against which the compensator bears. The compensator is an optional part of the inner operating member 12 and is a metal rod having substantially the same coefficient of expansion as the outer operating member 11, for reasons which will be discussed more fully hereinafter.

The upper end of operating member 11 is attached in any suitable manner to base plate 21 which serves to anchor in place the actuator and thus produce useful motion as a result of the relative movement of the adjacent end of the other operating member 12. Base plate 21 is located within housing 22 by means of which the actuator is mounted to be operational. The housing is provided with a hollow shank 23 through which the actuator passes. The end of the shank may be threaded as at 24 to mount the housing in a threaded bore in the wall of the combustion chamber of a jet engine or other device, to locate the portion of the actuator extending beyond the housing inside the combustion chamber where it is subjected to the temperatures existing within the combustion chamber. The upper portion of shank 23 may be given a polygonal shape in order to facilitate application of a wrench to the housing to mount the housing in a threaded opening.

The thermally responsive actuator may be associated with any suitable mechanism that is to be operated thereby. As typical of such mechanisms, there is indicated generally at 25 in FIG. 1 an electric switch of the normally closed type. Inside housing 22 and just above base plate 21 is filler plate 26 which has a central opening through which the upper end of operating member 11 passes. Above the filler plate and separated therefrom by a ring of insulating material 27 are two switch blades 28 and 29 which are likewise insulated from each other by annular insulating members 30. On the free ends of the switch blades are mounted electrical contacts 31 and 32 respectively, which, when in engagement with each other as in FIG. 1, complete an electrical circuit. Switch blades 28 and 29 are connected to electrical conductors 35 in any suitable manner.

Above the upper switch blade is another annular insulating member 33 and above that is cover plate 34 which closes the upper end of the housing. Cover plate 34 may be held in place in any suitable manner; but the walls of the cylindrical housing are here shown as being spun or crimped down over the upper face of cover plate 34 in order to provide a dust and water-proof seal at this joint.

Compensator 20 has on its upper end a head 36 which is the operative end of the inner operating member 12 of the actuator. Head 36 is fastened to switch blade 28 by pin 37. Upper switch blade 29 has an opening 39 through which passes the tip of plunger 40 to bear against the upper surface of the lower switch blade 28. The plunger 40 is slidably mounted in a bore 34a in cover plate 34 and is normally urged downwardly against a switch blade in a direction to exert an axial force on the operating member 12, by means of compression spring 41. This spring bears against plunger 40 at one end and at the other end against screw plug 42 received in a threaded end of the bore 34a in the cover plate. Thus the lower switch blade 28 is held between the tip of plunger 40 and head 36 of the operating member 12 of the actuator, the plunger 40 passing through upper switch blade 29.

The position of the upper switch blade 29 and contact 31 carried thereby can be adjusted vertically of the drawing by means of adjusting screw 44 located in a threaded bore 34a in cover plate 34. Adjusting screw 44 has an insulated tip which bears against the upper side of switch blade 29 so that by rotation of the screw the position of contact 32 relative to contact 31 may be adjusted. By this means the actuator can be set to disengage the contacts and open the associated electrical circuit at any desired ambient temperature.

Having described the construction of a preferred form of my invention, I shall now describe briefly its operation. In a typical installation, the threaded portion 24 of shank 23 is screwed into a threaded hole in a wall (not shown) such as the wall of a combustion chamber. The length of the operating members 11 and 12 beyond the housing shank is thus directly exposed to a body of gaseous fluid which may be either static or moving, although in other applications the fluid may be a liquid. It is the temperature of this fluid body surrounding tube 11 that is to be sensed for control purposes and to which the actuator is designed to respond.

The hot fluid surrounding the actuator heats tube 11 causing the tube to elongate so that the inner end of the tube and plug 14 move away from the other end of tube 11 which is anchored to base plate 21. Because of the relatively low coefficient of thermal expansion of the material from which elements 12 are made, there is little or no change at the higher temperature in the length of the row of these elements, more particularly in the distance between the inner end of compensator 20 and plug 14. The elongation of outer tube 11 causes the inner end of operating member 12 to move downwardly in FIG. 1; and plunger 40 follows the movement of the operating member because of the pressure exerted on it by spring 41. Since switch blade 28 is held between plunger 40 and head 36 of the operating member of the actuator and moves with the actuator, the movement resulting from heating the actuator causes contact 31 to be moved away from contact 32, opening the electrical circuit in which these contacts are placed. As mentioned before, the temperature at which these two contacts separate may be adjusted by means of screw 44.

Inner tube 15 at all times keeps the elements 12a of the operating member in axial alignment; and the pressure of spring 41 axially of the row always keeps successive elements in contact with one another. Elements 12a may be made of any desired length, typically being about ½ inch in length. It has been determined that these segments, being relatively short, do not break under tremendous vibrational or shock loads whereas a solid rod of the same length as the row of elements 12a would inevitably break. Consequently the accuracy of the actuator remains unimpaired when subjected to these severe operating conditions, because the elements remained unchanged in their length and consequently the length of the entire row remains unchanged by mechanical stresses.

Elements 12a of the inner operating member are spaced from the outer tube 11 by annular space 17 which retards the transfer of heat to the inner operating member and promotes a quick response to a rise in ambient temperature. This slow heating of the inner operating member had the effect of increasing the amount of relative movement at the outer or upper end of the actuator. While there is a differential expansion for a given rise in temperature of both the operating members, the expansion is greater if there is also a differential temperature between the two members. This difference in temperature is obtained under rapidly rising ambient temperatures by insulating the inner operating member from the outer one by means of the annular air gap 17 which retards the transfer of heat to the inner member.

The annular spacing between the two operating members 11 and 12 is maintained by suitable guide means near both ends of the members. The pin 37 fastening switch blade 28 to the compensator head also serves as a guide to center the inner member 12 at one end in a manner similar to the action of guide 16 at the other end of member 12. Guide 16 is preferably of ceramic or other electrically non-conductive material in order to insulate the inner member electrically from outer member 11.

Compensator 20 is an optional feature of the invention and may be dispensed with under some conditions; but it is preferred when a high degree of accuracy of the temperature of operation is required. Since the compensator has substantially the same coefficient of thermal expansion as the outer member 11, the effective length of the inner operating member for purpose of obtaining differential expansion is the distance between the inner end of compensator 20 and plug 14. This distance equals the length of the row of elements 12a plus the centering guide 16. The actuator is desired to operate under widely different sets of conditions, as mentioned above. One of these is in starting up a jet engine when the actuator must heat up from normal room temperatures to the operating range of the jet engine; and it must be able to respond to a malfunction during this time when it is heating. After the engine has been running for some time, all of the parts of the actuator are raised in temperature yet it is desired that it again respond to a temperature of pre-established value. This is accomplished by locating the entire length of the row of elements 12a outside housing 22 and within the body of fluid which is being sensed for control purposes. That length of the two operating members which is contained within hollow shank 23 is not directly exposed to the rapidly changing temperatures, and does change temperature but at a slower rate. The compensator 20 compensates in large part for the difference between warm-up and operating conditions in an engine since as the parts of the compensator are warmed up it elongates in the same proportion as tube 11. The result is that the actuator opens the electric switch at substantially the same ambient temperature whether the engine is hot or cold. For this reason the length of compensator 20 is designed so that the end of it projects a short distance beyond the end of hollow shank 23, the exact distance being controlled by the operating conditions for which the actuator is designed.

An additional advantage of my improved construction is the fact that the temperature sensing device is not required to have the axis of the row of elements 12a a straight line. The elements 12a still operate properly within tube 15 even though the restraining tube and outer tube 11 are bent or curved to some degree. Where a high degree of curvature is anticipated, the segments 12a are made shorter, or are spherical, as shown in the embodiment of the invention disclosed in FIG. 5.

A variational embodiment of my invention is shown in FIG. 4 in which the actuator is constructed as previously described, except for differences which will now be explained. As may be seen by reference to FIG. 4, compensator 20a has a shoulder 45 over which the upper end of restraining means 15 is crimped to fasten the two members together. Above shoulder 45, compensator 20a is of reduced diameter and extends upwardly to terminate in an insulated tip 46. This tip passes through an axially aligned opening in plate 47 to be guided thereby and thus maintain the upper end of operating member 12 in annularly spaced relation to the outer operating member 11. Compression spring 48 surrounds and is laterally supported by the reduced diameter portion of compensator 20a. The spring bears at one end against guide plate 47 and at the other end against shoulder 45 on the compensator. Tube 15 maintains the elements 12a of the inner operating member in proper alignment while spring 48 exerts pressure axially of the row of elements to keep successive elements always in contact with each other.

This electric switch mechanism illustrated in FIG. 4 is essentially the same as that previously described, except that there is no plunger passing through the upper switch blade and the lower blade is not fastened to the actuator member. Within housing 22 and above guide plate 47 are two switch blades 50 and 51 which carry electrical contacts 52 and 53 respectively. These two switch blades are insulated from each other and from the housing by various layers of insulating material indicated at 55. The upper end of the housing is closed by cover plate 57 carrying adjusting screw 44. This electrical switch is of the normally closed type and opens in response to elongation of the actuator in the same manner as previously described.

A further variational form of my invention is illustrated in FIGS. 5 and 6 wherein the segmented operating member is composed of elements of a spherical nature, rather than cylindrical. Construction of this form also differs from those previously described in that the means for restraining the elements of the inner operating member is changed in shape and position.

The outer operating member 60 is tubular, as before. It is closed at its lower or inner end by plug 61 which is welded or otherwise attached to tube 60 to provide a connection between the two members. The upper end of tube 60 is welded as indicated at 62, or attached in any other suitable manner, to housing 22.

The inner operating member 64 consists of a plurality of spherical elements 64a strung like beads on rod 65 which has a sliding fit at its inner end in an axial bore in plug 61. At its outer end, rod 65, which is the restraining means in this form of the actuator, is anchored in place by a pair of lock nuts 66 on opposite sides of a fixed wall 67.

In this embodiment of the invention there is no compensator 20. This element of the inner operating member has been replaced by plunger 68 slidably mounted upon guide rod 65. At one end, plunger 68 bears against the outer end of the row of elements 64a and at the other end, by means of arm 68a, the plunger bears against switch blade 50 which carries electrical contact 52. Compression spring 70 surrounds rod 65 and bears at one end against plunger 68 and at the other end against some fixed abutment, such as one of the lock nuts 66. The force exerted by spring 70 is axially of the row of elements 64a, and through the intervening plunger 68, maintains a force on the row of elements in a direction that successive elements are maintained in contact with each other while their axial alignment is maintained by restraining means 65.

Except for the omission of the compensating member, it will be seen that the embodiment of my invention in FIGS. 5 and 6 is essentially the same as those already described except there is a reversal in the relative position of the segmented actuating member and the restraining means, as compared with the embodiment of FIG. 1. The segmented actuating member surrounds the restraining means instead of being surrounded as in the previous embodiments.

Plunger 68 performs one of the functions of compensator 20 since it is a rigid member co-axial with and at one end of the row of elements 64a. In this position, it transmits motion of the row to the lower switch blade which is to be actuated by the differential expansion of members 60 and 64. It will be noted that spherical elements 64a are of lesser diameter than the inside diameter of operating member 60 in order that the two operating members are annularly spaced apart. This air gap surrounding the inner operating member retards the transfer of heat to the inner member, thus maintaining as far as possible the maximum difference in temperature between the two operating members of the actuator.

From the foregoing description it will be apparent that various changes in the construction and arrangement of the components of my invention may be made by persons skilled in the art without departing from the spirit and scope of my invention. Accordingly it is to be understood that the foregoing description is considered to be illustrative of, rather than limitative upon, the invention defined by the appended claims.

I claim:

1. In a thermally responsive actuator of the differential expansion type in which the operating members have different coefficients of thermal expansion, the combination comprising:
    a first operating member comprising a plurality of separate, individual elements arranged in a row with successive elements in contact;
    a second operating member surrounding the first member;
    restraining means maintaining the elements in a row and spaced from the second operating member;
    a fixed abutment; and spring means bearing against the abutment and exerting a force along the row of elements to maintain contact between successive elements in the row.

2. In a thermally responsive actuator as claimed in claim 1, the combination in which the elements each have a bore passing through the element and the restraining means is a rod passing through said bores to maintain the row of elements in alignment.

3. In a thermally responsive actuator as claimed in claim 1, the combination in which the restraining means is a tubular member surrounding the first operating member and maintaining the segments in a row, said tube being inside and annularly spaced from the second operating member.

4. In a thermally responsive actuator of the differential expansion type in which the operating members have different coefficients of thermal expansion, the combination comprising:
    a first operating member comprising a plurality of separate, individual elements arranged in a row with successive elements in contact, said elements having a low coefficient of thermal expansion;
    a second operating member surrounding the first member and having a relatively higher coefficient of thermal expansion;
    restraining means maintaining the elements in a row and spaced from the second operating member;
    spring means maintaining the elements in contact; and a rigid member coaxial with the row of elements and disposed in contact therewith to extend beyond the second operating member, said rigid member having a coefficient of thermal expansion substantially equal to that of the second operating member.

5. In a thermally responsive actuator of the differential expansion type in which the operating members have different coefficients of thermal expansion, the combination comprising:
    a first operating member comprising a plurality of separate, individual elements arranged in a row with successive elements in contact;
    a tubular member surrounding and engaging the first operating member to maintain the elements in a row;
    a second operating member of tubular configuration surrounding the said tubular member and annularly spaced therefrom;
    and guide means inside the second operating member and centering the tubular member therein, said guide means having a sliding contact with the tubular member at one end thereof permitting relative longitudinal movement between the tubular member and guide means.

6. In a thermally responsive actuator as claimed in claim 5, the combination in which the guide means is electrically non-conducting.

7. In a thermally responsive switch operating mechanism of the differential expansion type having operating members with different coefficients of thermal expansion which move one blade of a pair of switch blades, the combination comprising:
    a first operating member comprising a plurality of separate, individual elements arranged in a row with successive elements in contact and a metallic member at one end of the row engageable with said one switch blade;
    a tube surrounding the first operating member to maintain the elements in a row and fastened to the metallic member at one end of the row;
    spring means maintaining successive elements in the row in contact;
    a second operating member of tubular configuration surrounding the said tube and annularly spaced therefrom;
    and guide means inside the second operating member and centering the tube therein, said guide means having a sliding contact with the tube at the end thereof remote from the switch blade to permit relative longitudinal movement between the two operating members, the guide means being electrically non-conductive to insulate the two operating members from each other.

References Cited in the file of this patent

UNITED STATES PATENTS

| | | |
|---|---|---|
| 637,343 | Von Koehring | Nov. 21, 1899 |
| 1,651,972 | Smalley | Dec. 6, 1927 |
| 2,393,841 | Titcomb | Jan. 29, 1946 |
| 2,691,710 | Collins et al. | Oct. 12, 1954 |
| 2,705,746 | Strange | Apr. 5, 1955 |
| 2,814,694 | Moodie | Nov. 26, 1957 |